US00RE39223E

(19) United States
(12) Reissued Patent
Toutountzis

(10) Patent Number: US RE39,223 E
(45) Date of Reissued Patent: Aug. 8, 2006

(54) TERMITE CONTROL

(75) Inventor: Vasilios Toutountzis, Sorrento (AU)

(73) Assignee: TMA Corporation Pty Ltd, Malaga (AU)

(21) Appl. No.: 09/425,271

(22) Filed: Oct. 21, 1999

Related U.S. Patent Documents

Reissue of:
(64) Patent No.: 5,417,017
Issued: May 23, 1995
Appl. No.: 08/040,305
Filed: Mar. 30, 1993

U.S. Applications:
(63) Continuation of application No. 08/859,561, filed on May 20, 1997, now abandoned, which is a continuation-in-part of application No. 07/825,299, filed on Jan. 23, 1992, now abandoned, and a continuation-in-part of application No. 07/575,908, filed on Aug. 31, 1990, now abandoned.

(30) Foreign Application Priority Data

Sep. 4, 1989 (AU) ..... PL6128
Feb. 25, 1993 (AU) ..... PL7520

(51) Int. Cl.
*A01M 1/00* (2006.01)
*E04B 1/72* (2006.01)

(52) U.S. Cl. ..... 52/101; 52/250; 52/292; 52/515; 52/738.1; 52/741.3; 174/107; 245/8

(58) Field of Classification Search ..... 52/101, 52/169.1, 169.14, 170, 250, 292, 294, 414, 52/515, 517, 528, 660, 664, 741.11, 741.3, 52/396.04, 396.05; 428/907; 245/8; 43/118, 43/119, 132.1

See application file for complete search history.

(56) References Cited

U.S. PATENT DOCUMENTS 356,374 A * 1/1887 Parks ..... 43/119
414,251 A 11/1889 Phillips
539,485 A 5/1895 Perret (Continued)

FOREIGN PATENT DOCUMENTS

| | | |
|---|---|---|
| AU | 4707/91 | 5/1963 |
| AU | 64977/69 | 6/1971 |
| AU | A-85176/82 | 6/1981 |
| AU | A-11412/83 | 2/1983 |
| AU | A-21934/83 | 2/1983 |
| AU | A-16980/83 | 7/1983 |
| AU | 27242/95 | 1/1996 |
| AU | 41004/97 | 1/1997 |
| AU | 58337/96 | 1/1997 |
| AU | 23741/97 | 12/1997 |
| AU | 28583/97 | 1/1998 |
| FR | 79 04240 | 2/1979 |
| JP | 3-187441 | 8/1991 |

OTHER PUBLICATIONS

"Preventing Damage to Building by Subterranean Termites and Their Control", Farmers Bulletin, #1911, U.S. Dept. Agriculture Nov. 1942.*

Product Sample, EHWA Wire Cloth Co., Ltd.

Stainless Steel Wire Cloth, EHWA Wire Cloth Co., Ltd.

Translation of Les Termites Et La Protection Des Constructions, Cahiers Du Centre Scientifique Et Technique Du Batiment 1950.

*Primary Examiner*—Robert Canfield
(74) *Attorney, Agent, or Firm*—Shewchuk IP Services, LLC; Jeffrey D. Shewchuk

(57) ABSTRACT

A barrier to termites particularly suitable for protecting buildings comprising a mesh made of a material that is resistant to breakdown in the environment of use and is resistant to secretions deposited by termites, such as stainless steel, and is also sufficiently hard to not be attacked by termites, such as having a hardness not less than about Shore D70. The pores of the mesh being dimensioned so the maximum linear dimension in any direction of the pores is less than the maximum linear dimension of the cross-section of the head of the species of termite to be controlled.

59 Claims, 8 Drawing Sheets

U.S. PATENT DOCUMENTS

| | | | | | |
|---|---|---|---|---|---|
| 944,502 | A | | 12/1909 | Priddle | |
| 985,681 | A | * | 2/1911 | Konopinski | 52/728 X |
| 1,201,756 | A | * | 10/1916 | Perry | 428/256 X |
| 2,017,106 | A | * | 10/1935 | Sandell | 428/256 X |
| 2,242,266 | A | * | 5/1941 | Scales | 52/101 |
| 2,312,293 | A | | 2/1943 | Weiss | |
| 2,316,660 | A | | 4/1943 | Bailey | |
| 2,425,235 | A | * | 8/1947 | Ferrante | 428/907 X |
| 2,533,439 | A | * | 12/1950 | Elder | 428/256 X |
| 2,857,630 | A | | 10/1958 | Bishop | |
| 2,899,771 | A | * | 8/1959 | Burris | 428/907 X |
| 3,171,722 | A | | 3/1965 | Lomar et al. | |
| 3,285,810 | A | | 11/1966 | Hart | |
| 3,461,639 | A | | 8/1969 | Merrill | |
| 4,102,093 | A | | 7/1978 | Harris | |
| 4,195,681 | A | | 4/1980 | Douglas et al. | |
| 4,319,423 | A | | 3/1982 | Judd | |
| 4,366,644 | A | | 1/1983 | Lawrence | |
| 4,547,626 | A | * | 10/1985 | Pedersen et al. | 174/107 |
| 4,549,385 | A | | 10/1985 | Cohen et al. | |
| 4,635,393 | A | | 1/1987 | Pfeffer, Sr. et al. | |
| 4,636,543 | A | | 1/1987 | Helton | |
| 4,667,436 | A | | 5/1987 | Benson | |
| 4,678,699 | A | * | 7/1987 | Kritchevsky et al. | 428/256 X |
| 4,823,520 | A | * | 4/1989 | Ebeling et al. | 52/101 |
| 4,907,386 | A | * | 3/1990 | Ekroth | |
| 5,035,172 | A | | 7/1991 | Waggoner | |
| 5,094,045 | A | | 3/1992 | Tamashiro | |
| 5,567,914 | A | | 10/1996 | Minarovic et al. | |
| 5,669,187 | A | | 9/1997 | Bushong | |
| 5,860,266 | A | * | 1/1999 | Martinet et al. | |
| 5,904,007 | A | * | 5/1999 | Trapnell | |

* cited by examiner

Fig 1.
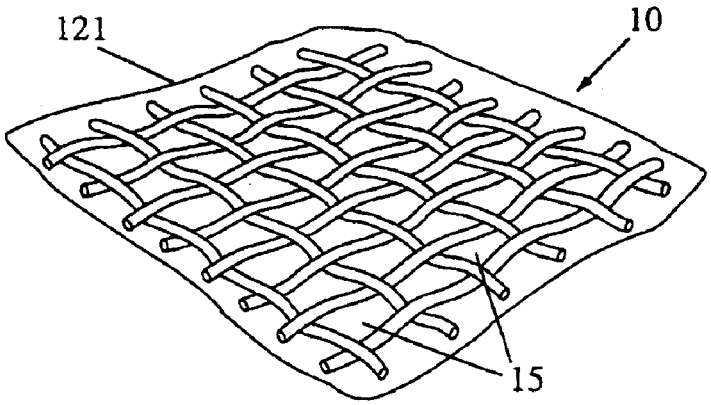
Fig 2A.
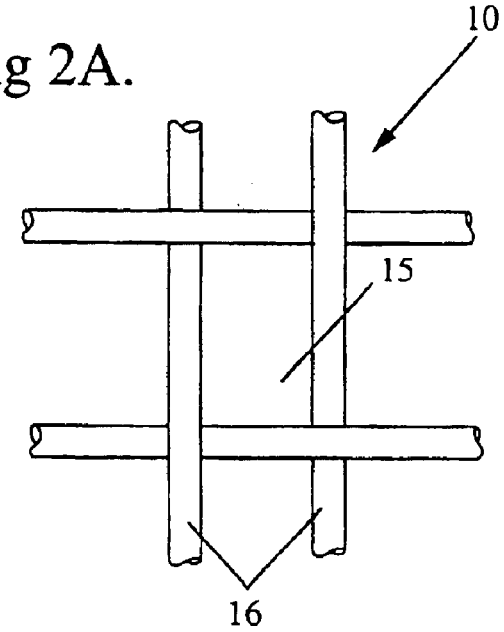
Fig 2B.
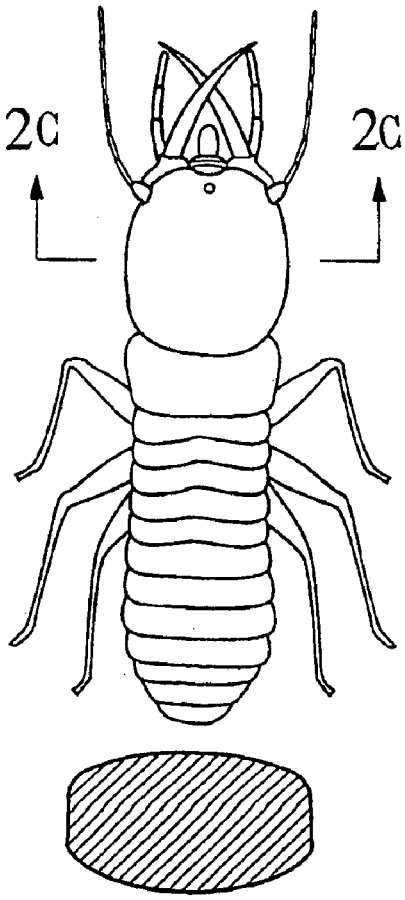
Fig 2C

Fig. 6 (Amended)
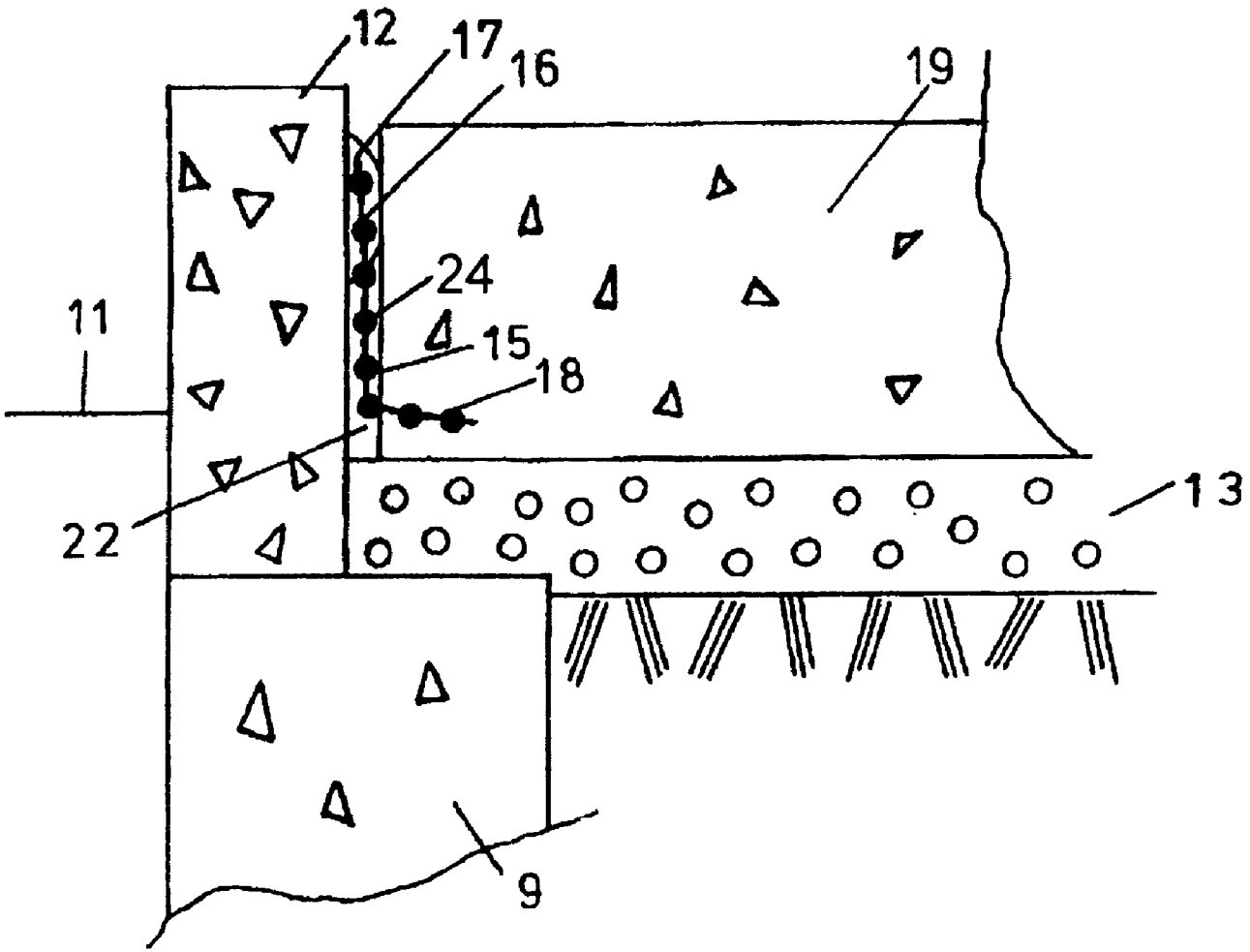

TERMITE CONTROL

Matter enclosed in heavy brackets [ ] appears in the original patent but forms no part of this reissue specification; matter printed in italics indicates the additions made by reissue.

This is a *Continuation of U.S. Ser. No. 08/859,561, filed May 20, 1997, which is a Reissue Application of U.S. Pat. No. 5,417,017, which issued May 23, 1995 from U.S. Ser. No. 08/040,305, filed Mar. 30, 1993, which is a* Continuation-in-Part application of U.S. Ser. Nos. 07/575, 908, filed Aug. 31, 1990, now abandoned, and 07/825,299, filed Jan. 23, 1992, now abandoned.

BACKGROUND OF THE INVENTION

This invention relates to the control of termites in relation to buildings and other structures and in particular to achieving such control without the use of harmful chemicals.

The most popular procedure for providing a barrier to the access of termites to buildings or other structures supported in or on the ground is to saturate the ground beneath or around the structure with appropriate chemicals, to kill any existing termites, and to provide a residue of the chemical within the ground which will remain effective for many years against the passage of termites therethrough to the structure. It has been proposed in published patent specifications to provide a mat of fibrous or absorbent material to be laid below the foundations of a building with the fibre or porous material saturated with, or containing an appropriate chemical which will kill termites that attempt to pass therethrough. Refer to published Australian Patent Application Nos. 85176/82, 11412/83, 16980/83 and 21934/84.

These methods of termite control have the major disadvantage as the chemicals are usually of a composition that is considered highly dangerous to humans and thus constitute a hazard to the people applying the chemicals and to other people in the vicinity. Under some atmospheric conditions, the chemicals can be carried considerable distances from the area where they are being applied. Thus people unaware of the presence of the chemicals, and thus not alerted to take protective action, may also be exposed to the potential danger of the chemicals used to control termites. The danger continues to exist after the initial application of the chemical so long as the chemical remains effective against the termites.

Also, as it is necessary to establish a high concentration of the chemical in the ground beneath where the building is to be built in order to obtain the required period of protection against termite entry to the building, leaching of the chemical will occur over time. This leaching will naturally reduce the effectiveness of the chemical as a barrier to the termites. As the chemical in many instances is initially placed beneath a concrete slab upon which the building is erected, it is very difficult to apply further chemical to replace that removed by the leaching and so maintain an effective barrier. Even more importantly, chemicals leached from the ground beneath the building are carried by the leaching water into other areas where it may be hazardous to humans, animals or crops. Also the leached chemical can enter rivers, streams or lakes or underground water catchments which can potentially spread the chemicals over a very wide area thus increasing the potential exposure to the chemical. It will also be appreciated that the chemicals leached from building sites over a relatively wide area can collect in a single river, stream or other catchment, thus resulting in an accumulation of chemicals that break down very slowly.

Many buildings, particularly homes, are built on a slab of concrete and although termites can normally not penetrate concrete, cracks frequently develop in the concrete thus permitting the passage of termites therethrough into the building. Even when the cracks are of a fine nature, they do provide the facility for the termites to burrow through the concrete by secreting materials which will break down the concrete along the fine cracks and thus permit the termites to burrow therethrough.

Also, in buildings erected on a concrete slab, it is common practice to provide pipes or conduits that extend through the concrete slab, such as water and waste pipes. As the concrete is cast in situ about these pipes or conduits, a small opening often develops about the pipe or conduit due to shrinkage of the concrete during curing.

These openings also provide access for termites through the concrete into the building structure. Thus even where a building is erected on a concrete slab, the ground beneath the slab must be treated with substantial quantities of chemicals to prevent access by termites to these openings.

It has also been known to use sheet metal as a barrier to termites such as galvanized steel plates on the top of stumps that support a building. Although this may be effective and commercially viable in relation to a building supported on stumps, it is expensive and has installation problems when considered in respect to a building supported on a concrete slab. Sheet metal is difficult to join on-site in a manner to exclude passage of termites through the joint. Also, if the metal sheet is sufficiently strong to prevent accidental puncture by workman traffic on-site, it is then difficult to bend and shape to the required contours to fit with the building structure in a manner to provide an effective termite barrier. It would also be difficult to achieve an effective seal around pipes or conduits that must pass through the sheet.

Sheet metal, including stainless steel, as proposed in French Patent Application No. 79 04240 (Publication No. 2453952) is used to provide a barrier to termites travelling up a wall to enter a building in a manner analogous to a metal plate on a building stump. However, that sheet is preformed for a specific installation and is not appropriate for on-site construction to a range of shapes and configuration with the ability to maintain the integrity of a barrier against the passage of termites.

In addition to buildings, termites attack a wide range of structures and equipment including wooden poles and other wooden structures, underground cables and conduits made of a range of materials that will be attractive to termites. The only effective protection for such structures are chemical treatment or solid metal barriers that are resistant to termite attack.

It is therefore the object of the present invention to provide a barrier that will inhibit the passage of termites such as into a building or structure, the barrier being both effective and avoids the use of chemicals that are harmful to humans and/or the environment.

With this object in view there is provided by the present invention an improved termite barrier which is substantially resistant to termite chewing and corrosion, the termite barrier comprising a mesh sheet formed of a material resistant to breakdown in the environment of use and substantially resistant to termite secretions, said material having a hardness of not less than about Shore D70 for resistance to termite chewing, the pores of the mesh having a linear dimension in any direction less than the maximum linear dimension of the cross section of the head of the species of termite to be controlled.

Conveniently the pores of the mesh having a linear dimension in at least one direction, less than the minimum lineal dimension of the cross section of the head of the species of termite to be controlled. Preferably, the pores in the mesh am polygonal with a maximum diagonal dimension less than the maximum linear dimension of the cross section of the head of the species of termite to be controlled.

Termites of the species which attack wood, timber or the like are characterised by having a head formed of a hard substantially nondeformable structure. The body of these termites is a relatively soft and weak material. Also these termites have a head which is of substantially larger cross sectional dimensions than any other part of their body. Accordingly the head cross sectional size determines the ability of the termite to pass through an opening or passageway such as may exist in any form of termite barrier.

It is also known that termites secrete a liquid saliva or material which is capable of breaking down the physical structure of many materials into at least particles of a size that can be transported by the termites so as to facilitate the formation of a passage for the termites to pass through. The secreted material includes, amongst other components, acids such as formic acid.

The mesh sheet can be laminated with a flexible plastic sheet or sandwiched between two separate sheets.

Alternatively the mesh may be embedded in one plastic sheet, preferably with both sides of the mesh sheet covered by the plastic material. The combining of the mesh sheet and the plastic provides protection of the mesh sheet against damage that may cause displacement of the strands forming the mesh, with resultant enlargement of the openings or pores of the mesh in a specific area thereof to a size to permit the passage of the termites therethrough.

It is also to be appreciated that it is normal practice to provide a sheet of plastic material beneath the concrete slab upon which a building is to be erected to provide a barrier against the entry of moisture through the concrete into the building. Accordingly, by incorporating the mesh sheet with or into a plastic sheet, the resulting assembly can perform the two functions of providing a moisture and a termite barrier.

In practical application of the termite material a continuous layer thereof is positioned beneath an underside of the slab extending to a perimeter of the slab in all directions and upwardly about the perimeter of the slab to a distance above the slab and above the ground level adjacent thereto.

Another application is in a building structure erected on a ground level or near ground level concrete slab, and having a non integral termite resistant adjacent structure and a strip of the termite barrier material arranged with the respective marginal edge portions along the opposite longitudinal edges of the strip integrally secured to the slab and the adjacent structure to establish integrity of the connection between the slab and the adjacent structure against the passage of termites.

Preferably the mesh is woven from fine stainless steel wire or filaments of the appropriate material, such as stainless steel, that is resistant to corrosion by most materials that the mesh will be in contact with or associated with during its use in the termite barrier. In particular, the stainless steel resists rust through contact with moisture, and resists attack by most acid materials, including formic acid and other constituents of the secretion released by termites. However, it is to be understood that wires, strands or filaments of other materials may be used to produce the mesh sheet provided the material has the required resistance to breakdown when exposed to the environment and materials present in the ground and to termite attack, and is sufficiently hard that the particular species of termites can not chew through the strands or filaments. Other materials may be fibres of ceramics, glass or hard plastics.

It is known that the physical dimensions of termites vary from species to species and that in different areas of the world, different species of termites are predominant. Accordingly, the actual size of the pores of the mesh will be determined by the particular termite or range of termites to be controlled in the particular area where the mesh is to be used.

In the area around Perth, Western Australia, the most common and dangerous termites are of the Coptotermes family which have a head of a generally circular cross sectional somewhat flattened shape, as shown in FIG. 2B with a maximum linear dimension of between 1 to 1.5 mm. It is thus suitable to use in that area a mesh having pores or openings having a maximum dimension in any direction of not more than 0.85 mm, and preferably not more than 0.6 mm. For convenience in manufacture, the pores will normally be of a generally rectangular shape with the length of the sides 0.4 and 0.7 mm respectively.

The wire of filament may be of any convenient commercial size and typically may be in the range of 0.1 to 0.2 mm in diameter. The wire of filament may be of cross-section is preferred and more readily commercially available in the manufacture of mesh. The mesh may also be produced by stamping or punching holes of the required shape in sheet or film of metal or other suitable material of an appropriate thickness.

In most species of termites there are worker termites and soldier termites, the latter having larger heads than the worker termites in some species, but not all. It is thought to be normal for the soldier termites to lead or at least travel with the invention. Thus it is believed that if the mesh has pores of a size to prevent the passage of the soldier termites, this would be effective in inhibiting the worker termites from passing alone through the mesh. The workers are the ones that cause the damage and must be stopped by the mesh.

The plastic material forming the sheet with which the mesh sheet can be laminated or embedded in, is conveniently PVC, but may be of any other suitable plastic which will provide a moisture barrier and will not deteriorate and break down when buried in the ground for the normal life expectancy of termite barriers which may be of the order of 15 to 30 years.

Conveniently, the termite barrier is produced in sheets of any convenient size and may be produced in a form of roll of a width of the order of 5 to 10 meters.

The advantages of the termite barrier as proposed above are principally that there are no harmful chemicals used in the creation of the barrier, the barrier will have an effective life commensurate with the life of the building. Further, the barrier can be conveniently transported and applied without the level of precautions required when handling pesticides or other chemicals and with a minimum of skill. Further as the barrier is in the form of a mesh, it is substantially more flexible and easily worked as by cutting, contouring and shaping, particularly in comparison with solid sheet metal.

BRIEF DESCRIPTION OF THE DRAWINGS

The invention will be more fully understood from the following description of the termite barrier as applied to buildings and other uses and as illustrated in the accompanying drawings, wherein:

FIG. 1 is a perspective view of a section of mesh as proposed to be used as a termite barrier;

FIG. 2a is an enlarged view of a portion of the mesh shown in FIG. 1;

FIG. 2b is an enlarged view from above of a typical termite

FIG. 2c is a cross sectional outline of the head of the typical termite along line 2c—2c of FIG. 2b;

FIG. 6 is a cross-sectional view of portion of an alternative type of building construction to which the termite barrier has been applied;

DETAILED DESCRIPTION OF THE PREFERRED EMBODIMENTS

Referring now to FIGS. 1 and 2a–2c of the drawings, the termite barrier is in the form of a woven mesh 10 made of corrosion resistant stainless steel wires or filaments such as 304 grade stainless steel. The termite barrier may also include a flexible moisture impervious plastic sheet 121 formed to the woven mesh 10. Preferably, both sides of the woven mesh 10 are covered by a plastic sheet 121. The woven filaments form a series of pores or openings 15 in the mesh which are of a generally rectangular shape with the distance between the two more closely spaced sides 16 of the rectangle and the diagonal thereof is less than the maximum cross sectional dimensions of the head of the species of termite in respect of which the mesh is to form a barrier (FIG. 2c). *For instance, the soldier termite of species Mastotermes darwiniensis, of northern Australia, has a maximum head width of 3.25 mm. To form a termite barrier for Mastotermes darwiniensis, the distance between the two more closely spaced sides 16 of the rectangle and the diagonal thereof should be 3.25 mm or less.*

Figure 3:
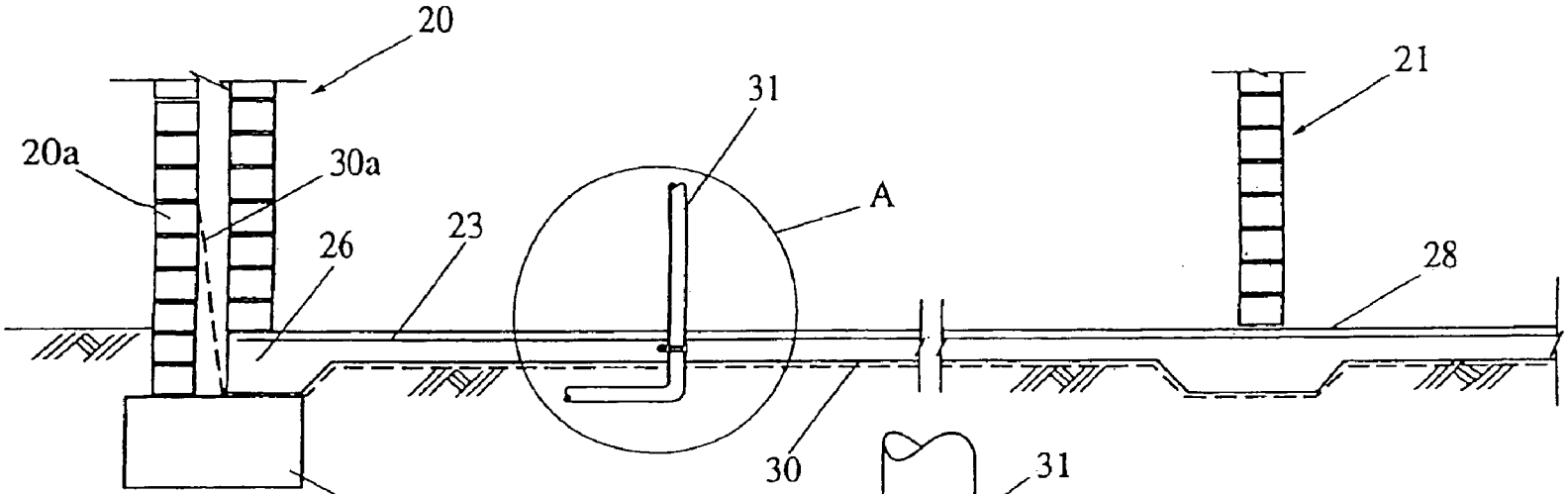
FIG. 3 is a diagrammatic sectional view through portion of a building showing the application of the termite barrier thereto.

Referring now to FIG. 3 which shows a cross section of a portion of a building having an external double brick wall 20 and an internal single brick wall 21 in association with a poured concrete slab base 23. As is conventional in this form of construction, a continuous concrete footing 25 is formed to support the double brick wall 20. The perimeter of the concrete slab 23 has a perimetal portion 26 of increased depth also supported on the footing 25, and additional areas of increased depth are also provided beneath the internal single brick walls 21 as indicated at 28 in FIG. 3.

After the footings 25 have been poured and cured, an integral sheet of termite barrier mesh 30 is laid over the complete area where the slab 23 is to be poured with portion of the mesh overhanging beyond the footing 25 as will be referred to further hereinafter. When the mesh 30 is laid it is contoured to closely follow the contour of the ground including following the contour of any trenches or depressions in the ground, such as are required to accommodate the increased thickness areas 26 and 28 of the concrete slab. Because the termite barrier is in the form of a wire mesh, it can be readily deformed to follow these contours, and can be readily folded where there is excess material resulting from a change in the contour of the surface over which it is being laid. Where a pipe or duct such as indicated at 31 is required to pass through the slab 23, an appropriately located aperture is cut in the mesh 30 and the edge of the mesh clamped about the pipe or duct as hereinafter further described with reference to FIG. 4.

For convenience in handling, the mesh is produced in rolls of a convenient width such as 5 m, and the mesh is laid in position with the edges of adjacent strips overlapped and secured together in a multi fold lap-type joint wherein as each fold is made it is hammered or rolled flat throughout its length to provide a secure and permanent join that is termite-proof.

After the strips of mesh have been placed in position and effectively secured along the overlapping edges, and the form-work for the concrete slab 23 is in position, the slab is poured in the conventional way with conventional steel reinforcement therein and a moist barrier sheet therebeneath (not shown). After the elapse of the appropriate curing time, the commencement of the erection of the external double brick wall of the building can be undertaken. In regard to the double brick wall construction as seen in FIG. 3 at 20 the overhanging edge portion 30a of the termite barrier mesh is folded upwardly so as to lie between the respective inner and outer layers of bricks. The outer layer 20a of bricks is built up to a level of at least 10 cm conveniently between 20 to 30 cm above the surrounding ground level, then the upper edge portion 30 of the barrier mesh is bent outwardly over the bricks forming the outer layer and thereafter, the rest of the bricks of the outer and inner wall are built up in the conventional manner.

There is thus formed a complete barrier in the perimeter double brick wall which is continuous with the barrier beneath the concrete slab to prevent the entry of termites into the interior of the building.

Figure 4:
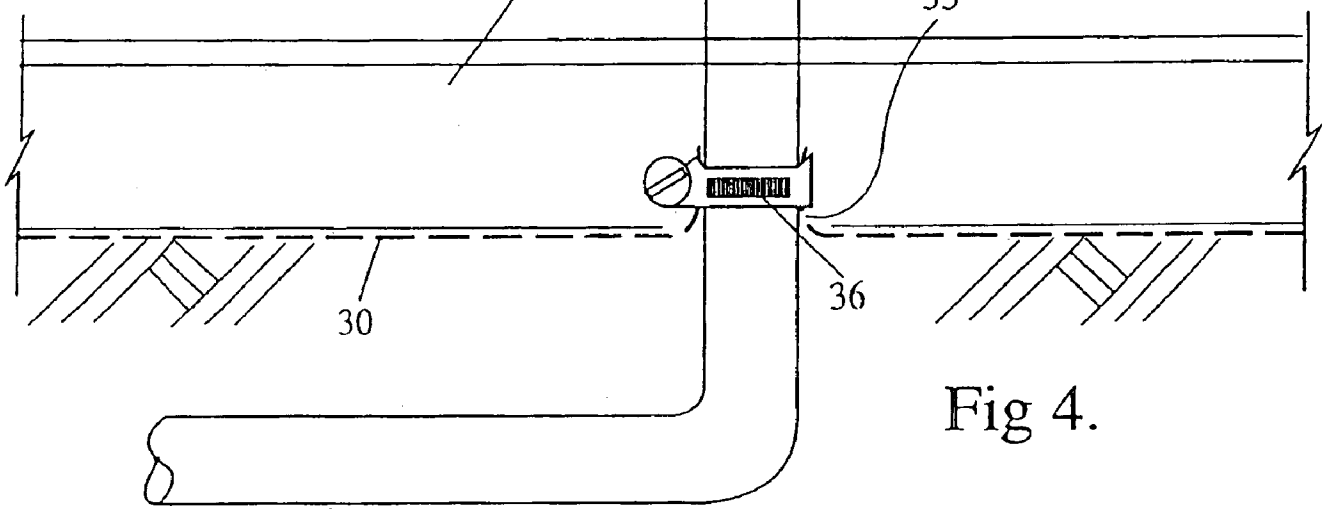
FIG. 4 is an enlarged view of the portion A shown in FIG. 3 where a conduit passes through the termite barrier.
Figure 5:
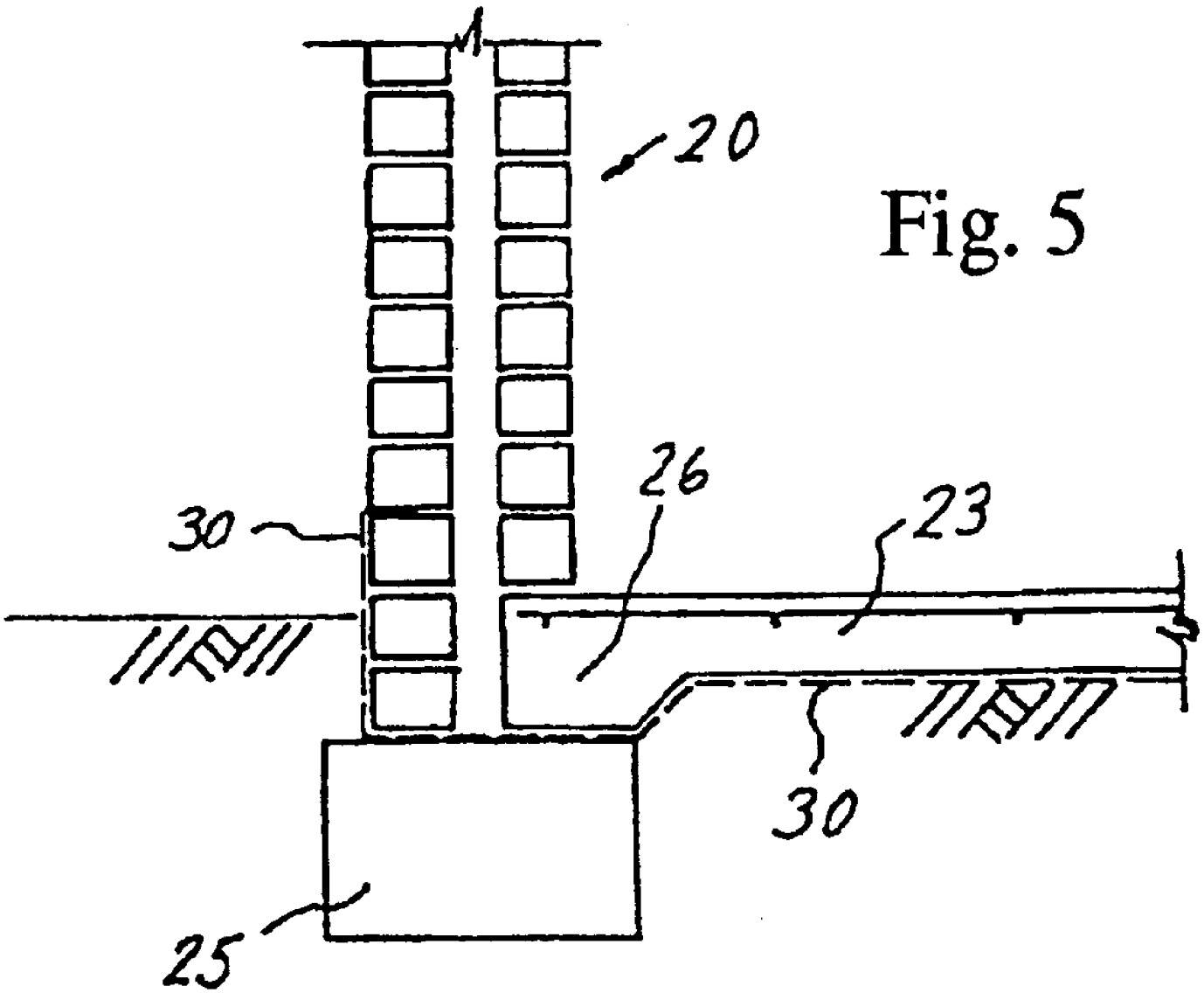
FIG. 5 is a cross sectional view of a portion of a building to which the termite barrier has been applied in an alternative form to that shown in FIG. 3.

As an alternative, as shown in FIG. 5, the barrier mesh 30 projects outwardly beneath both layers of the double brick wall and is then bend upwardly as indicated at 30 against the external face of the perimeter wall. If desired, the barrier mesh at the upper end is folded and entered between two layers of bricks at a level of 10 or more cm above the ground level. Each of the above alternative constructions may be used in other forms of external wall constructions such as a timber framed inner wall and a brick outer wall. Also the construction shown in FIG. 5 may be used with a single timber framed external wall.

Where a conduit, such as 31 in FIG. 3 previously referred to, projects through the concrete slab 23, the barrier mesh has an aperture cut therein and prior to pouring the slab of the size smaller in diameter than the duct to be passed therethrough. The mesh about the periphery of the hole so formed can then be stretched and formed into an upwardly or downwardly projecting flange 35 as seen in FIG. 4 and a clamp 36 is fitted around the flange to press it firmly into engagement with the external surface of the duct 31. The clamp 36 may conveniently be in the form of a conventional stainless steel hose clamp.

Preferably the flange 35 is formed to project upwardly from the normal level of the barrier mesh as shown in FIG. 4 so that when the slab is cast, the flange and the clamp secured about the duct will be embedded in the concrete forming the slab. It will be appreciated that a woven mesh is capable of being stretched without enlarging the holes or pores therein to a size to permit termites to pass through. The stretching is achieved by distorting the rectangular pores into a parallelogram shape thus reducing the dimensions of the pores in one direction while they are enlarged in the other direction. The reduction in one direction is sufficient to prevent the passage of termites.

Referring now to FIG. 6 of the drawings, there is shown in a simplified representation, a cross section through part of the slab and wall of a building. The footing 9 is constructed of concrete with appropriate metal reinforcement and is located some distance below the normal surface of the ground indicated at 11. The concrete beam 12 is normally precast and located on site in position on the footing 9, a series of such beams being provided to form the perimeter of the base of the building. As the beams 12 are precast and subsequently transported to the building site, it is not convenient to have barrier material embedded in the beam during the casting thereof, particularly as there is the possibility of damage to the barrier material during subsequent transportation and installation of the beams.

Following completion of the positioning of the perimeter beams 12 in place upon the footings, the area bounded by the beams is prepared for pouring of the concrete slab by the laying down and compacting of a bed of stones as indicated at 13 prior to the pouring of the full slab. Also prior to pouring of the slab, a continuous strip 15 of the termite barrier material is arranged so one marginal edge portion 16 is applied to the internal face of the beam 12 by appropriate mechanical fixings such as concrete nail and is overlayed by an adhesive cement layer as indicated at 17. After curing of the adhesive cement, the concrete floor slab 19 is poured and during such pouring the other marginal edge portion 18 of the barrier material strip 15 is embedded in the concrete slab.

The concrete of the slab may extend up to and abut the internal face of the beam 12, thereby also encasing the marginal portion 16 of the termite barrier strip that is adhered to the beam, or in alternative structures, an expansion gap, may as indicated at 22 be left between the perimeter edge of the slab 18 and the adjacent beam 12. Where such an expansion gap is left, as seen in FIG. 6, the barrier strip is provided with a re-entrant fold 21 extending the length thereof which will provide the flexibility and freedom for movement of the floor slab relative to the beam without the risk of fracture of the termite barrier strip. As shown in FIG. 6, the marginal edge position 18 extends into the slab through the edge face thereof. However, it is to be understood that the termite barrier step may also extend into the underside of the slab with the marginal portion then turned upwardly into the under side of the slab.

It is also to be understood that the beam 12 as shown in FIG. 6 can be replaced by a cast in situ or precast wall or similar upwardly extending member. In such an arrangement the barrier strip can be installed as shown in FIG. 6 or each marginal edge portion of the barrier strip 15 can be embedded in the slab and upright member respectively during casting of each or can be embedded in one and adhered or bonded to the other. In constructions where the slab and other member are cast separately, it is preferable to provide a re-entrant fold [21] *24* extending the length of the barrier strip 15 to provide the ability for limited freedom of movement between the structural members without fracture of the barrier strip.

The above description of the installation of the termite barrier strip between a beam or wall and a slab may also be applied to providing an effective termite barrier between an existing concrete member and a newly cast member which may be functioning as an extension of an existing structure. In such circumstances, the same technique and layout as above discussed with respect to the beam and slab, may be applied to extending an existing slab.

Figure 8:
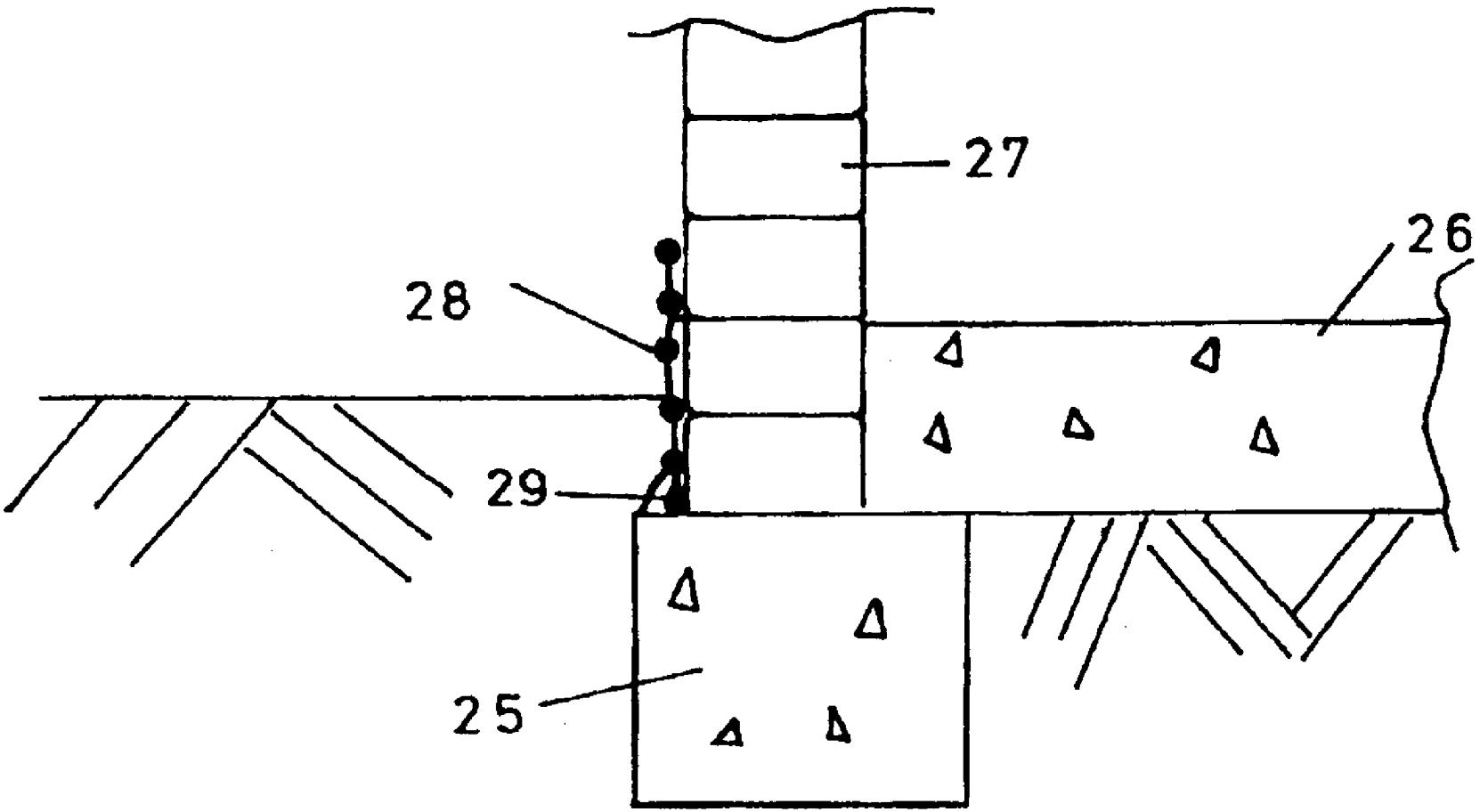
FIG. 8 is a cross sectional view of a portion of a building to which the termite barrier has been fitted after construction of the building.

Referring now to FIG. 8 of the drawings where there is illustrated a further application of the termite barrier strip along the external perimeter wall of an existing building. In this situation as illustrated, the existing building comprises a conventional footing 25, a floor slab 26 and an external wall 27, which may be in the form of a brick or poured concrete construction. In such an existing structure, there is not access to the underside of the slab 26 or the interface between the slab 26 and the wall 27 and accordingly, it is necessary to install the termite barrier strip externally. This is achieved by initially removing the earth adjacent the external wall to a depth to expose the existing concrete footing and then applying the barrier material strip 28 extending up the external face of the wall from the footing to a substantial distance above the ground level. The lower marginal edge of the termite barrier strip, which is seated on the footing 25, is secured thereto and to the lower portion of the wall by suitable adhesive cement as indicated at 29. The upper marginal portion of the termite barrier strip may be anchored to the wall by concrete nails or the like at suitable intervals along the length, or may also be secured thereto by the use of adhesive cement or both. In this regard, it is to be noted that in view of the inability of the termites to survive when exposed to ambient conditions, it is only necessary for the termite barrier strip 15 to extend approximately 20 to 30 centimeters above normal ground level to effectively prevent termites entering the building or to cause them to build external galleries that are readily visible and hence detectable.

Figure 7:
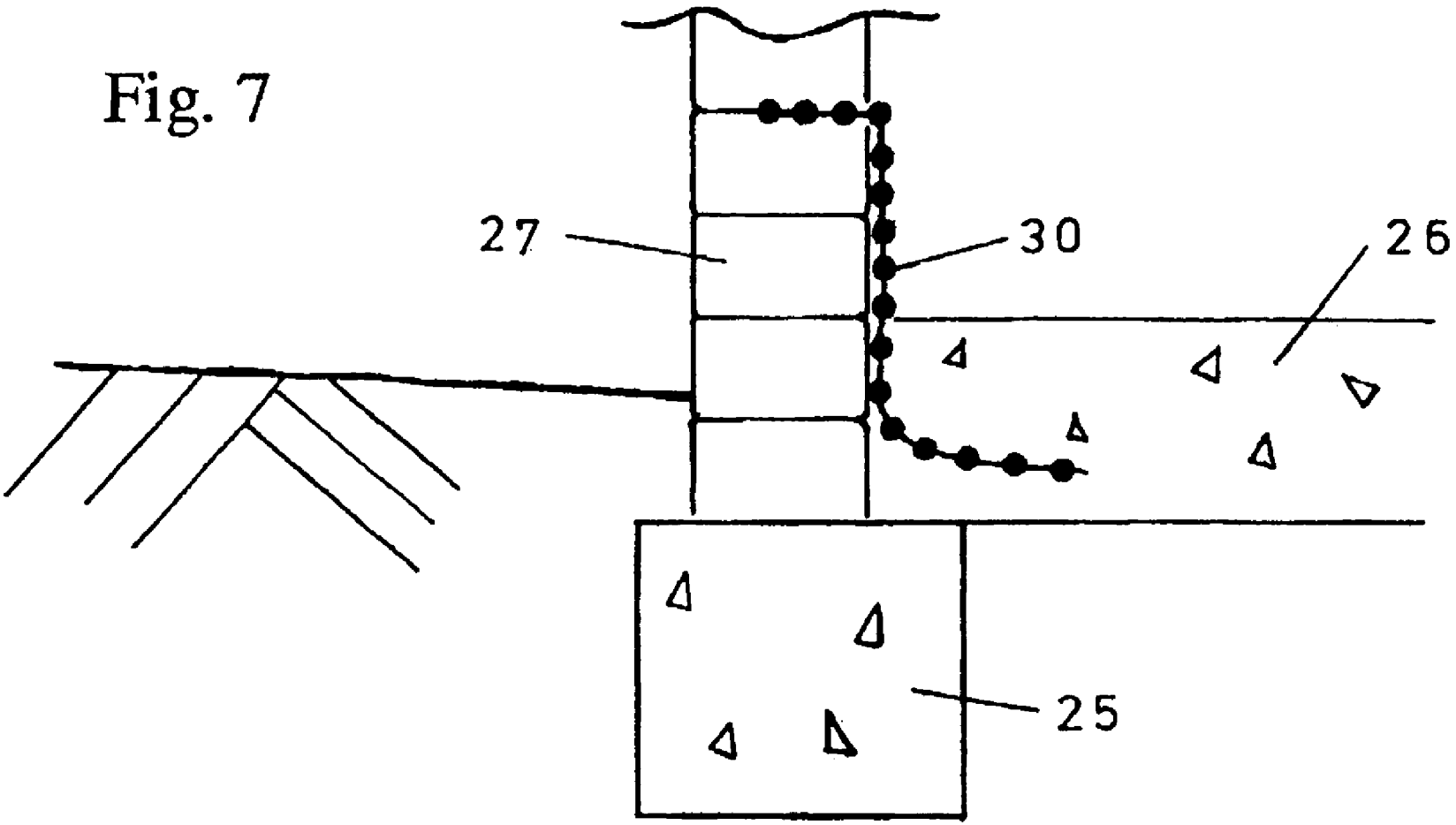
FIG. 7 is a cross sectional view of portion of a further alternative type of building construction to which the termite barrier has been applied.

There is shown in FIG. 7 a modification of the construction shown in FIG. 8 which is suitable for use during the construction of the building as compared with that shown in FIG. 7 which is more appropriate for application to existing buildings. In FIG. 7, the conventional footing 25, floor slab 26 and external wall structure 27 are the same as that previously described with respect to FIG. 8. The termite barrier strip 28 has a lower portion thereof embedded into the slab 26 during the pouring of the latter and is subsequently positioned so as to lie adjacent the wall 27 on the inner side thereof. During the laying of the bricks or blocks 29 which form the wall 27, the other marginal edge portion of the barrier strip 28 is positioned between two adjacent bricks or blocks with the normal mortar or cement is located on either side of the marginal edge portion of the barrier strip so that when the wall is finished, the marginal edge portion is integral with the wall structure and will prevent the passage of termites.

It is to be understood that the term bricks or blocks includes building blocks of a range of materials including natural stone, rock, concrete and the brick or block may be of steel or aluminum in block or sheet form.

Figure 9:
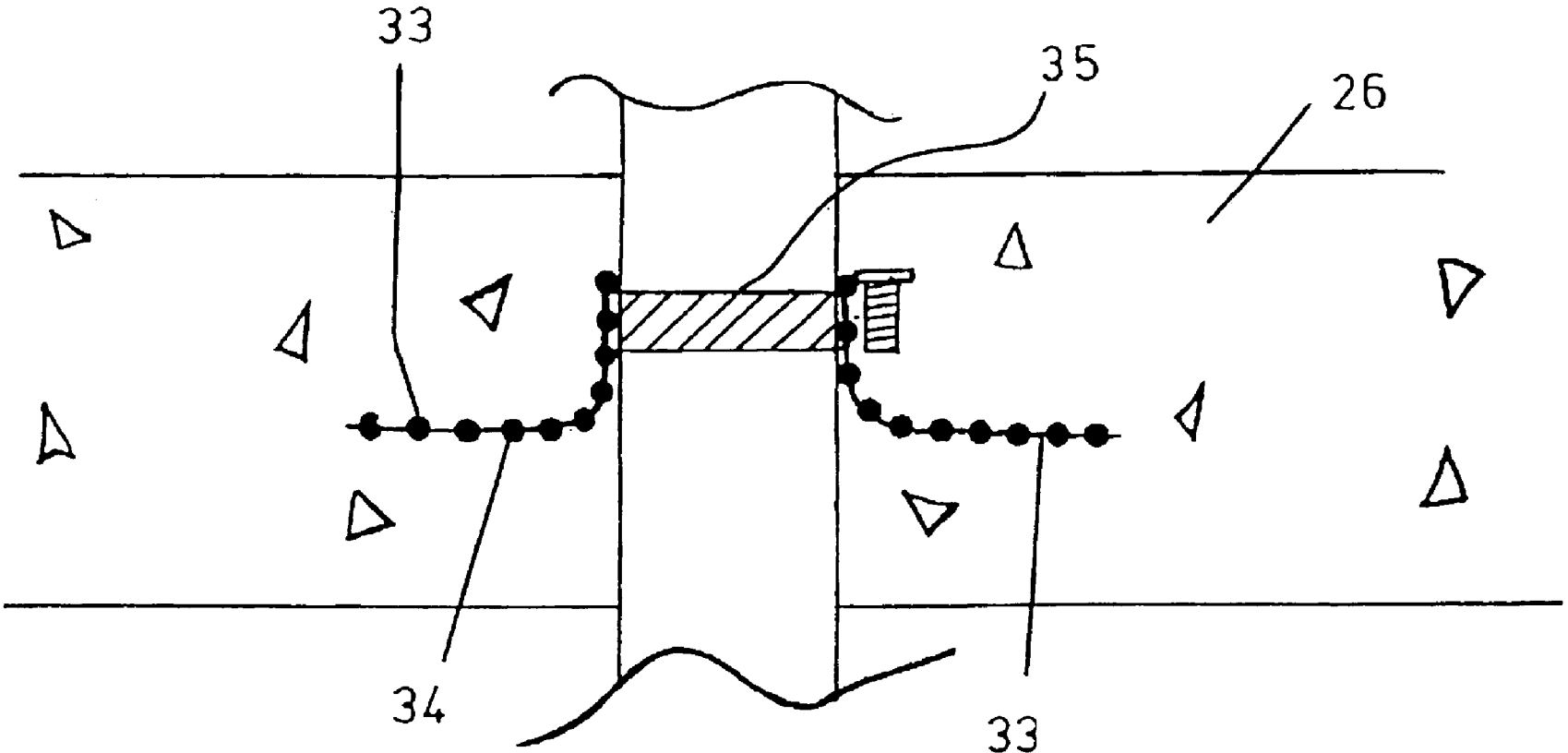
FIG. 9 is a cross sectional view of portion of a building slab through which a conduit extends and having a termite barrier fitted thereto in an alternative manner to that shown in FIG. 4.

As previously referred to with respect to FIG. 4, it is frequently necessary in building structures to provide conduits which project through the concrete base slab of the structure, and the opening provided in the slab for this purpose is a potential avenue for the passage of termites. In order to preclude the passage of termites, a sheet 34 of border material with a central aperture can be placed over the conduit 31 prior to the pouring of the slab with the inner peripheral portion of the sheet clamped above the exterior of the conduit such as by a conventional hose clip as indicated at 35 in FIG. 9. During the subsequent pouring of the slab, the outer perimeter areas 33 of the sheet of termite barrier material is embedded in the concrete when poured and thereby provide an effective barrier to termites between the conduit and the slab as commonly arises in the prior art structures.

In the previous description of the practical application of the present invention, reference has been made to using adhesive cement to secure a marginal edge portion of the barrier strip to an adjacent member which may be concrete or building bricks or blocks. The nature of the adhesive cement is a mixture of conventional cement and fine sand to which there is added a proprietary cement adhesive agent, such as that marketed in Australia under the Registered Trade Mark BONDCRETE. The sand used in the adhesive cement is selected so that it is sufficiently fine that the individual particles will freely pass through the openings in the mesh of the barrier strip thereby ensuring an effective bond between the barrier strip and the adjacent structural member and to prevent the possible formation of areas which are not adhered and therefore potential passages for termites.

Figure 11:
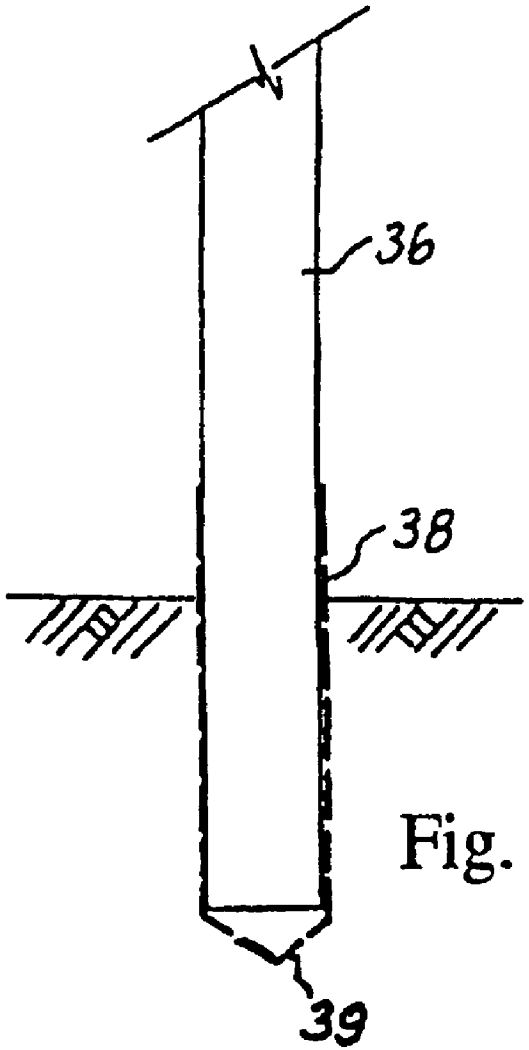
FIG. 11 is a sectional view through an upright post with the termite barrier fitted to the lower end thereof.

The termite barrier material used as above described in relation to building may also be used as a termite barrier in respect of a wide range of structures incorporating material which is subject to attack by termites. One such additional application is around the portion of a post or like member which has the lower portion thereof buried in the ground. It is customary to treat the lower portion of such posts with appropriate chemicals to inhibit attack by termites, however, such chemicals have a limited effective life and environmental disadvantages. The termite barrier material of the present invention can be formed into a sleeve or pocket 38 closed at one end 39 and fitted over the portion of the post to be buried in the ground with the closed end lowermost as shown in FIG. 11. The sleeve is of sufficient length to project at least 10 to 20 centimeters above the ground level when the post is erected.

When the barrier mesh is to be used for this purpose, it may be initially woven in a tubular form and then cut to the requisite length for each particular application. The individual lengths of the tubular mesh are then folded at the bottom end to form an effective closure. This closure may be formed by flattening a portion of the end of the tube and then forming multiple folds therein with the folded portion being subsequently pressed or hammered flat to form a multi lapped joint which is not penetrable by the termites.

When the mesh is not produced in a tubular form, a flat piece of mesh may be rolled to form a tube with the respective edges of the strip folded in a multi lapped Joint which is again rolled or hammered flat.

In the above description the application of the termite barrier material to the lower end of a post it is to be understood that the same construction of termite barrier can be used on any member which is to be buried in the ground, whether it is in the nature of or forming the function of a post or for any other purpose.

Figure 10:
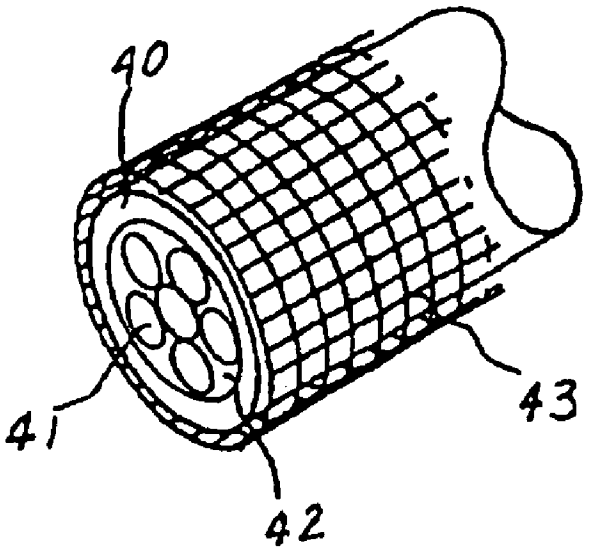
FIG. 10 is a perspective view of a cable in which the termite barrier has been incorporated.

Another use for the termite barrier material is in protecting cables, particularly underground cables which incorporate a material which is susceptible to attack by termites. Such cables normally are of a construction as shown in FIG. 10 and have an outer protective covering 40 of a suitable material in addition to the wires or other elements 41 of the cable, such as electrical or optical cable, and the normal insulation or other coatings or wrappings 42 in which they are located.

It is known to weave in situ about the core of such cables fabric or wire reinforcing materials and it is proposed by the present invention that there also be woven about such cable cores a mesh of stainless steel wires or filaments 43 of the required dimensions to form a barrier against the passage of termites into the cable. If the termite barrier is not woven in situ about the core of the cable, then a wrapping of the barrier material of the required construction may be fitted about the cable with a longitudinal seam being formed by a lapped joint in the manner previously discussed. The termite barrier is located in or beneath the outer tough covering normally provided on such cables, as an alternative to about the exterior as shown in the drawing.

The termite barrier as previously described may be used in many other applications in addition to those described with reference to the accompanying drawings without departing from the present invention.

What is claimed is:

1. A termite barrier which is substantially resistant to termite chewing and corrosion, the termite barrier comprising[;] a mesh sheet formed of a material [resistant to breakdown in the environment of use and] substantially resistant to termite secretions, said material having a hardness of not less than about Shore D70 for resistance to termite chewing, the mesh sheet having pores [wherein each pore has a linear dimension in all directions less than the maximum linear dimension of the cross section of the head of the species of termite to be controlled], *wherein the pores are open to permit fluid flow therethrough, the pores having a maximum opening dimension less than 3.25 millimeters, the mesh sheet being positioned in relation to a structure and ground underneath the structure to provide a termite barrier for the structure*.

2. The termite barrier as claimed in claim 1, wherein the pores of the mesh sheet have a linear dimension in at least one direction[, less than the minimum lineal dimension of the cross section of the head of the species of termite to be controlled] *of not more than 0.85 mm*.

3. The termite barrier as claimed in claim 1, wherein the pores of the mesh sheet are polygonal with the maximum diagonal information less than [the maximum linear dimension of the cross section of the head of the species of termite to be controlled] *3.25 mm*.

4. The termite barrier as claimed in claim 1, wherein the pores of the mesh sheet are rectangular in shape.

5. The termite barrier as claimed in claim 4, wherein the rectangular pores each have a diagonal dimension less than 0.85 mm.

6. The termite barrier as claimed in claim 4, wherein the rectangular pores are dimensioned 0.40 mm by 0.70 [min] *mm*.

7. The termite barrier as claimed in claim 1, wherein the mesh sheet is made of a corrosion resistant grade of stainless steel.

8. The termite barrier as claimed in claim 1, wherein the mesh sheet is bonded to or embedded in a moisture impervious sheet.

9. In combination with a building structure erected on a ground level concrete slab, a termite barrier which is substantially resistant to termite chewing and corrosion, the termite barrier comprising:

a mesh sheet made of a material substantially resistant to termite secretions and having a hardness of not less than about Shore D70 for resistance to termite chewing, the mesh sheet having pores [wherein each pore has a linear dimension in all directions less than the maximum linear dimension of the cross-section of a head of a species of termite to be controlled], *the pores having a maximum opening dimension of less than 3.25 mm,* the termite barrier being positioned beneath an underside of the slab and extending to a perimeter of the slab in all directions and upwardly about the perimeter of the slab to a distance above the slab and above the ground level adjacent thereto.

10. The [combinations] *combination* as claimed in claim 9, further comprising a member projecting through the termite barrier and the slab, and a termite barrier sleeve integral with the termite barrier located beneath the slab and clamped in pressure engagement therewith about the perimeter of the member.

11. The combination as claimed in claim 10, wherein the sleeve is formed by cutting an opening in the termite barrier, said opening having a perimeter less than the perimeter of the member and stretching and deflecting the marginal area of termite barrier about the opening to form the sleeve.

12. A cable having a core of conductive member or members, and a protective covering surrounding the core, said covering including a termite barrier which is substantially resistant to termite chewing and corrosion, said termite barrier surrounding said core and comprising a mesh layer formed of a material substantially resistant to termite secretions and having a hardness of not less than about Shore D70 for resistance to termite chewing, the mesh sheet having pores wherein each pore has a linear dimension in all directions less than [the maximum linear dimension of the cross-section of a head of a species of termite to be controlled] *3.25 mm*.

13. In combination, a foundation structure for supporting a building, a termite barrier which is substantially resistant to termite chewing and corrosion for shielding the foundation structure to protect the building from termite invasion, the termite barrier comprising a mesh sheet formed of a material resistant to termite secretions and having a hardness of not less than about Shore D70 for resistance to termite chewing, the mesh sheet having *open* pores [wherein each pore has a linear dimension in all directions less than the maximum linear dimension of the cross-section of a head of a species of termite to be controlled] *permitting fluid flow therethrough, each open pore having a maximum opening dimension of less than 3.25 mm*, the termite barrier covering the foundation structure to protect the building supported thereon against termites.

14. In combination with a building structure erected on a ground level or near ground level concrete slab, having a non integral termite resistant adjacent structure, a strip of termite barrier material which is substantially resistant to termite chewing or corrosion, the termite barrier *material* comprising[;] a mesh sheet made of a material substantially resistant to termite secretions and having a hardness of not less than about Shore D70 for resistance to termite chewing, [the mesh sheet having pores wherein each pore has a linear dimension in all directions less than the maximum linear dimension of the cross section of a head of a species of termite to be controlled,] *the mesh sheet having pores wherein each pore has a maximum opening dimension of less than 3.25 mm,* said strip of termite barrier material having respective marginal edge portions along opposite longitudinal edges of the strip integrally secured to the slab and the adjacent structure to establish integrity of the connection between the slab and the adjacent structure against the passage of termites.

15. The combination as claimed in claim 14, wherein the adjacent structure is a further concrete structure.

16. The combination as claimed in claim 14, wherein the adjacent structure is composed substantially of a building material selected from the group consisting of brick, natural stone, rock, concrete block, steel and aluminum in block or sheet form.

17. The combination claimed in claim 14, wherein the slab and the adjacent structure are each [cat] *cast* in-situ concrete components, the respective marginal edge portions of the termite barrier strip being embedded into the slab and adjacent structure during the pouring of the concrete.

18. The combination claimed in claim 14, wherein the slab and adjacent structure are each preformed and the combination further comprises an adhesive resistant to attack by termites for bonding the marginal edge portions of the strip of termite barrier material to the slab and adjacent [structures] *structure*.

19. The combination claimed in claim 18, further comprising a mechanical fastener for additionally securing the respective marginal edge portions of the termite barrier strip at spaced intervals along the length thereof.

20. A post or column to be erected with an end portion thereof embedded in the ground, said end portion being enclosed in a protective sleeve closed at one end, said sleeve being made from a mesh sheet of a material substantially resistant to termite secretions and having a hardness of not less than about Shore D70 for resistance to termite chewing, the mesh sheet having pores [wherein each pore has a linear dimension in all directions less than the maximum linear dimension of the cross section of a head of a species of termite to be controlled] *wherein each pore has a maximum opening dimension less than 3.25 mm.*

*21. In combination with a building structure erected on a ground level or near ground level concrete slab, a termite barrier comprising:*

*an adjacent structure, built adjacent to but non-integrally with the building structure, the adjacent structure built of a termite resistant material; and*

*a strip of termite barrier material formed of a flexible sheet made of a mesh material substantially resistant to termite secretions and having a hardness of not less than about Shore D70 for resistance to termite chewing, the strip having pores wherein each pore has a maximum opening dimension of less than 3.25 mm, said strip of termite barrier material having respective marginal edge portions along opposite longitudinal edges of the strip integrally secured to the slab and the adjacent structure to establish integrity of the connection between the slab and the adjacent structure against the passage of termites.*

*22. The combination of claim 21, wherein the mesh material is selected from the group consisting essentially of:*

*material formed of wire filaments;*

*sheet material having holes stamped or punched therein; and*

*film having holes stamped or punched therein.*

*23. A termite barrier flange for preventing passage of termites between a cast concrete slab and a member projecting through the slab, said termite barrier flange comprising a body formed from a mesh material, the mesh material having pores, wherein each pore has a maximum opening dimension of less than 3.25 mm, the body having an*

*inner peripheral portion defining an opening adapted to receive the member and an outer peripheral portion adapted to be integrally secured to the slab.*

*24. The termite barrier flange as claimed in claim 23 wherein the outer peripheral protein is adapted to be embedded in the slab during pouring of the slab for integrally securing the outer peripheral portion to the slab.*

*25. The termite barrier flange as claimed in claim 23 wherein the inner peripheral portion comprises a cylindrical sleeve adapted to be clamped in pressure engagement with the member about a perimeter of the member.*

*26. The termite barrier flange as claimed in claim 25 further comprising a clamp for clamping the cylindrical sleeve in pressure engagement with the member.*

*27. The termite barrier flange as claimed in claim 23 wherein the outer peripheral portion extends radially outward from the inner peripheral portion.*

*28. The termite barrier flange as claimed in claim 23 wherein the material is substantially resistant to termite secretions and has a hardness of not less than about Shore D70 for resistance to termite chewing.*

*29. A method of termite barrier installation for a building structure, comprising the act of:*

*during erection of the building structure on a slab of concrete at or near ground level, positioning a mesh sheet coextensively with at least a portion of the slab, the mesh sheet being formed of a material substantially resistant to termite secretions, the material having a hardness of not less than about Shore D70 for resistance to termite chewing, the mesh sheet having open pores permitting fluid flow therethrough, the open pores having a maximum opening dimension of less than 3.25 mm to thereby exclude entry of termites into the building structure through said portion of the slab.*

*30. The method of termite barrier installation as claimed in claim 29 comprising casting the slab in-situ, and wherein the positioning of the mesh sheet comprises positioning the mesh sheet beneath the slab prior to pouring of concrete over the mesh sheet to cast the slab.*

*31. The method of termite barrier installation as claimed in claim 29 wherein the positioning of the mesh sheet comprises embedding the mesh sheet in the slab.*

*32. A method of termite barrier installation for a building structure, comprising the act of:*

*during erection of the building structure on a slab of concrete at or near ground level, positioning a sheet coextensively with at least a portion of the slab, the sheet being formed of a mesh material substantially resistant to termite secretions, the material having a hardness of not less than about Shore D70 for resistance to termite chewing, the sheet having open pores permitting fluid flow therethrough, to thereby exclude entry of termites into the building structure through said portion of the slab, the open pores having a maximum opening dimension less than 3.25 mm, wherein the positioning of the sheet comprises positioning the sheet beneath the slab.*

*33. The method of termite barrier installation as claimed in claim 32 wherein the slab has a perimeter, wherein the positioning of the sheet comprises positioning the sheet beneath the slab to extend to the perimeter of the slab in all directions and upwardly about said perimeter to terminate with an outer edge portion of the sheet at a distance above adjacent ground level.*

*34. The method of termite barrier installation as claimed in claim 33 wherein the outer edge portion of the sheet terminates above the slab.*

*35. The method of termite barrier installation as claimed in claim 32 comprising casting the slab in-situ, wherein the positioning of the sheet comprises positioning the sheet prior to pouring of concrete over the sheet to cast the slab, wherein the sheet completely covers a ground surface area where the slab is to be poured, and further comprising the act of:*

*contouring the sheet to closely follow contours of the ground surface area where the slab is cast.*

*36. A method of termite barrier installation for a building structure, comprising the act of:*

*during erection of the building structure on a slab of concrete at or near ground level, positioning a sheet coextensively with at least a portion of the slab, the sheet being formed of a mesh material substantially resistant to termite secretions, the material having a hardness of not less than about Shore D70 for resistance to termite chewing, the sheet having open pores permitting fluid flow therethrough, to thereby exclude entry of termites into the building structure through said portion of the slab, the open pores having a maximum opening dimension of less than 3.25 mm, wherein the positioning of the sheet comprises positioning the sheet above the slab.*

*37. A method of termite barrier installation for a building structure, comprising the act of:*

*during erection of the building structure on a slab of concrete at or near ground level, positioning a sheet coextensively with at least a portion of the slab, the sheet being formed of a mesh material substantially resistant to termite secretions, the material having a hardness of not less than about Shore D70 for resistance to termite chewing, the sheet having open pores permitting fluid flow therethrough, to thereby exclude entry of termites into the building structure through said portion of the slab, the open pores having a maximum opening dimension of less than 3.25 mm, wherein the building structure includes a termite resistant structure adjacent to and non-integral with the slab, and further comprising the act of:*

*integrally securing an outer edge portion of the sheet to the termite resistant structure.*

*38. The method of termite barrier installation as claimed in claim 37, wherein the integrally securing act comprises:*

*adhesively bonding the outer edge portion of the sheet to the termite resistant structure.*

*39. The method of termite barrier installation as claimed in claim 38, wherein the bonding comprises bonding with a bonding material which is resistant to termites.*

*40. The method of termite barrier installation as claimed in claim 37, wherein the integrally securing act comprises:*

*mechanically fixing the outer edge portion of the sheet to the termite resistant structure.*

*41. The method of termite barrier installation as claimed in claim 37, wherein the termite resistant structure is of concrete, and wherein the integrally securing act comprises:*

*casting the termite resistant structure in-situ such that the outer edge portion of the sheet is embedded into the termite resistant structure.*

*42. The method of termite barrier installation as claimed in claim 37, wherein the termite resistant structure is a wall of brick, and wherein the integrally securing act comprises:*

*constructing the wall of brick with the outer edge portion of the sheet embedded in the wall between two layers of bricks.*

*43. A method of termite barrier installation for a building structure, comprising the acts of:*

*during erection of the building structure on a slab of concrete at or near ground level, positioning a sheet coextensively with at least a portion of the slab, the sheet being formed of a mesh material substantially resistant to termite secretions, the material having a hardness of not less than about Shore D70 for resistance to termite chewing, the sheet having open pores permitting fluid flow therethrough, the open pores having a maximum opening dimension of less than 3.25 mm,*

*forming at least a portion of the sheet into a termite barrier flange; and*

*clamping the termite barrier flange in pressure engagement about a perimeter of a member projecting through the slab, to thereby exclude entry of termites into the building structure through said portion of the slab.*

*44. The method of termite barrier installation as claimed in claim 43 wherein the forming at least a portion of the sheet into a termite barrier flange comprises cutting an opening in the sheet, said opening having a perimeter smaller than the perimeter of the member, and stretching and deflecting a marginal area of the sheet about the opening to form the termite barrier flange about the member.*

*45. A method of termite barrier installation in a building structure erected on a concrete slab at or near ground level and having an adjacent structure which is non-integral to the concrete slab and is termite resistant, the method comprising the acts of:*

*integrally securing a first marginal edge portion of a strip to a portion of the slab, the strip being formed of a mesh material substantially resistant to termite secretions, the material having a hardness of not less than about Shore D70 for resistance to termite chewing, the strip having open pores having a maximum opening dimension less than 3.25 mm, the strip having a second marginal edge portion opposite the first marginal edge portion; and*

*integrally securing the second marginal edge portion of the strip to the adjacent structure, to thereby provide integrity between the slab and the adjacent structure against passage of termites and thereby exclude entry of termites into the building structure.*

*46. The method of termite barrier installation as claimed in claim 45 wherein the integrally securing the first marginal edge portion comprises bonding the strip to the slab by adhesive bonding.*

*47. The method of termite barrier installation as claimed in claim 46, wherein the bonding comprises bonding with a bonding material which is resistant to termites.*

*48. The method of termite barrier installation as claimed in claim 45 wherein the integrally securing the first marginal edge portion comprises mechanically fixing the strip to the slab.*

*49. The method of termite barrier installation as claimed in claim 45 wherein the integrally securing the first marginal edge portion comprises bonding the strip to the adjacent structure by adhesive bonding.*

*50. The method of termite barrier installation as claimed in claim 49, wherein the bonding comprises bonding with a bonding material which is resistant to termites.*

*51. The method of termite barrier installation as claimed in claim 45 wherein the integrally securing the second marginal edge portion comprises bonding the strip to the adjacent structure by mechanical fixing.*

*52. The method of termite barrier installation as claimed in claim 45 comprising casting the slab in-situ and wherein the integrally securing the first marginal edge portion comprises embedding the first marginal edge portion into the slab during casting.*

*53. The method of termite barrier installation as claimed in claim 45 comprising casting the adjacent structure in-situ and wherein the integrally securing the second marginal edge portion comprises embedding the second marginal edge portion into the adjacent structure during casting.*

*54. The method of termite barrier installation as claimed in claim 45 wherein the adjacent structure comprises a wall of brick construction and wherein the integrally securing the second marginal edge portion comprises embedding the second marginal edge portion in the wall between two layers of bricks.*

*55. A method of termite barrier installation for a building structure, comprising the acts of:*

*positioning a termite barrier flange around a member projecting through a slab of concrete at or near ground level, the termite barrier flange formed of a mesh material, the mesh material having pores, wherein each pore has a maximum opening dimension of less than 3.25 mm, the termite barrier flange comprising an inner peripheral portion defining an opening for the member and an outer peripheral portion extending from the inner peripheral portion;*

*establishing a seal against the passage of termites between the inner peripheral portion and the member; and*

*integrally securing the outer peripheral portion to the slab, such that the termite barrier flange protects against the passage of termites between the slab and the member projecting there through.*

*56. The method of termite barrier installation as claimed in claim 55 wherein the mesh material is substantially resistant to termite secretions, the mesh material having a hardness of not less than about Shore D70 for resistance to termite chewing.*

*57. The method of termite barrier installation as claimed in claim 55 comprising casting the slab in-situ and wherein the integrally securing comprises embedding the outer peripheral portion into the slab during casting.*

*58. The method of termite barrier installation as claimed in claim 55 wherein the establishing the seal comprises clamping the inner peripheral portion in pressure engagement with the member about a perimeter of the member.*

*59. A method of termite barrier installation for a building structure, comprising the act of:*

*during erection of the building structure on a foundation structure, covering at least a portion of the foundation structure with a termite barrier, the termite barrier being formed of a mesh material substantially resistant to termite secretions, the mesh material having a hardness of not less than about Shore D70 for resistance to termite chewing, the mesh material having pores wherein each pore has a linear dimension in all directions less than 3.25 mm, to thereby exclude entry of termites into the building structure through said foundation structure.*

* * * * *

UNITED STATES PATENT AND TRADEMARK OFFICE

CERTIFICATE OF CORRECTION

PATENT NO. : RE 39,223 E
APPLICATION NO. : 09/425271
DATED : August 8, 2006
INVENTOR(S) : Vasilios Toutountzis It is certified that error appears in the above-identified patent and that said Letters Patent is hereby corrected as shown below:

At Col. 4, line 36, delete “invention”, and insert therefor --workers--.

At Col. 6, line 50, delete “bend”, and insert therefor --bent--.

At Col. 7, line 54, delete “position”, and insert therefor --portion--.

At Col. 10, line 48, delete “information”, and insert therefor --dimension--.

At Col. 11, line 53, after “slab,”, insert --and--.

At Col. 13, line 5, delete “protein”, and insert therefor --portion--.

Signed and Sealed this

Fifth Day of December, 2006

JON W. DUDAS
*Director of the United States Patent and Trademark Office*